Jan. 1, 1952 — W. J. PECK — 2,580,829
AUTOMOBILE JACK
Filed Jan. 16, 1950 — 2 SHEETS—SHEET 1

INVENTOR.
WILLIAM J. PECK

Jan. 1, 1952   W. J. PECK   2,580,829
AUTOMOBILE JACK
Filed Jan. 16, 1950   2 SHEETS—SHEET 2
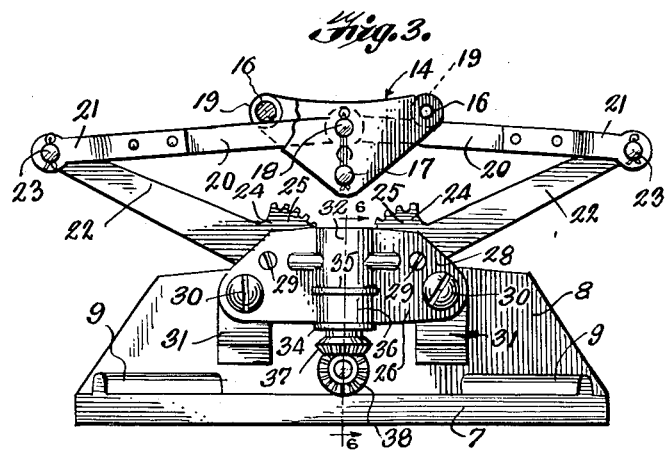
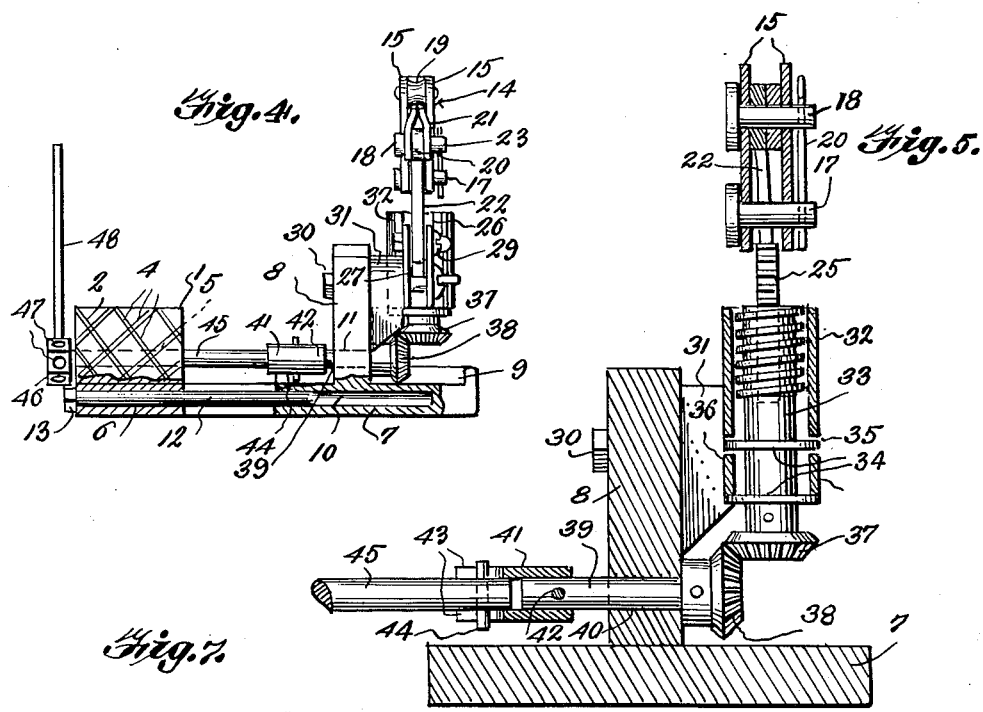
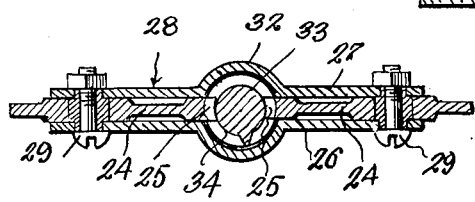
INVENTOR.
WILLIAM J. PECK
BY
ATTY.

Patented Jan. 1, 1952

2,580,829

UNITED STATES PATENT OFFICE 2,580,829

AUTOMOBILE JACK

William J. Peck, West Lebanon, N. H.

Application January 16, 1950, Serial No. 140,213

3 Claims. (Cl. 254—122)

This invention relates to a jack and while it is particularly adapted for raising an automobile or other motor vehicle and supporting the vehicle while changing a tire or applying chains thereto it will be understood that it may be used wherever found suitable.

The object of the invention is to provide a jack of such construction that a wheel may be run onto a block which holds the wheel raised and upward pressure then applied to an adjacent portion of an axle to further elevate the wheel and support the wheel out of contact with the block or the ground upon which it rested before rolling upon the block.

Another object of the invention is to provide a jack having raising means disposed in parallel relation to a block onto which the wheel of a car rolls, the raising means being shiftable towards and away from the block transversely thereof so that after the wheel is at rest upon the block the raising means may be moved to a position in which it can be upwardly adjusted and readily engaged with a portion of an axle to be raised.

Another object of the invention is to provide a jack wherein a saddle for engaging under an axle is carried by lever arms or links pivoted to upper ends of levers having arcuate racks at their lower ends which are pivotally mounted in a bearing bracket carried by a base and mesh with a worm screw which is also carried by the bracket and located between the racks so that as the worm screw is turned both of the levers will be swung vertically to raise or lower the levers and the saddle according to which direction the worm screw is turned.

Another object of the invention is to provide a jack of this character having its worm screw geared to a power shaft which is mounted transversely through the base and has an outer section rotatably passing through the block upon which the wheel of an automobile rests and thus dispose the outer end of the outer shaft-section in such position that it may be readily turned by a handle applied to its outer end.

Another object of the invention is to provide a jack of such size that it may be conveniently stored in the trunk of an automobile.

Another object of the invention is to provide a jack which is very strong and of simple construction.

The invention is illustrated in the accompanying drawings wherein:

Fig. 3 is a side elevation looking at the inner side of the jack.

Fig. 4 is a view looking at one end of the jack with portions in transverse section.

Fig. 5 is a sectional view upon an enlarged scale taken transversely through the jack along the line 5—5 of Figure 2.

Fig. 7 is a sectional view taken along the line 7—7 of Figure 6.

Figure 1:
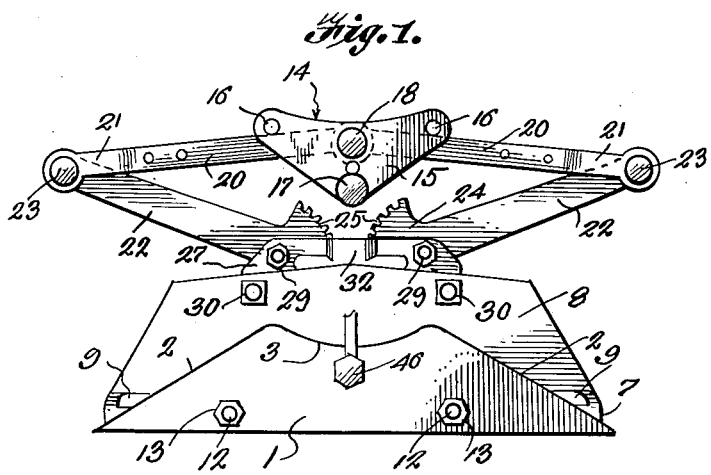
Fig. 1 is a side elevation of the improved jack looking at the outer side thereof.

This improved jack has axle engaging and lifting mechanism and outwardly of this mechanism is a block 1 which may be formed of suitable material, such as wood or metal, and has a flat bottom surface for resting flat upon the ground and end faces 2 which extend longitudinally of the block from ends thereof at an upward incline and serve as ramps leading to ends of a downwardly dished upper surface 3 constituting a seat for the tire of a wheel of an automobile or other vehicle. The surfaces of the ramps 2 are formed with grooves 4 so that a tire of a wheel will readily move along the ramps onto or off of the seat of the block, it being understood that ribs may be provided instead of the groove if so desired. An opening 5 is formed through the block transversely thereof midway the length thereof and other openings 6 are formed through end portions of the block parallel to the opening 5.

The lifting mechanism has a base 7 longitudinally of which extends a thick rib or riser 8 which is braced by beads 9 extending diagonally between corners of the base and side faces of the riser. Sockets 10 are formed in the base 7 transversely thereof in position for alignment with the openings 6, and midway its length the riser is formed an opening 11 which is aligned with the opening 5 of the block and so held when pins 12 are passed through the openings 6 and into the sockets 10. Heads 13 at outer ends of the pins bear against the outer side face of the block to limit inward movement of the pins and also cause the pins to be drawn outwardly when the lifting mechanism is shifted away from the inner side of the block to an adjusted position or the block is removed after lifting force has been applied to the axle and thereby allow unobstructed access to a wheel which is to be removed or to the tire of which an antiskid chain is to be applied.

Above the base of the lifting mechanism there is disposed a saddle 14 formed of triangular plates which are connected by pins 16, 17 and 18. The pins 16 carry spacers 19 which hold the side plates 15 in spaced relation to each other so that the links or arms 20 which have their upper ends loosely mounted about the pin 18 may freely tilt vertically. These arms or links diverge downwardly and have forks 21 at their lower or outer ends between which upper ends of levers 22 are pivotally mounted by pins 23. The levers have their lower ends formed with heads 24 having arcuate edges which are toothed to form racks 25. These heads are disposed between plates 26 and 27 which form a bearing bracket 28 and through the side plates and the heads are passed bolts or equivalent fasteners 29 by means of which the levers are mounted for vertical tilting movement. The levers and the companion links or arms 20 form a toggle structure and when the levers are tilted the saddle 14 will be shifted vertically and moved into or out of lifting and supporting engagement with an axle under which it is disposed. Bolts 30 which pass through end portions of the bracket also pass through the riser and since the riser is formed with laterally projecting blocks or bosses 31 the bracket will be held in spaced relation to the riser.

Midway the length of the bracket 28 its side plates are offset outwardly to form a vertically disposed tubular bearing 32 in which a vertically disposed threaded post 33 is rotatably mounted. This post, which may be termed a worm, is formed near its lower end with vertically spaced collars or annular flanges 34 and slots 35 are formed transversely of the walls of the tubular bearing in order that straps 36 formed by portions of the tubular bearing between the slots and its lower end may be offset inwardly and engage about the post between the flanges and thus prevent the post from dropping downwardly in its bearing. At its lower end the post carried a bevelled gear 37 which meshes with a companion bevelled gear 38 carried by a drive shaft 39 disposed horizontally and rotatably mounted through an opening 40 formed transversely through the riser 8. This opening 40 is aligned with the opening 5 of the block 1 and at its outer end the shaft 39 carries a socket 41 which is secured to the shaft by a pin 42 and has its outer end formed with diametrically opposed slots 43 into which fit end portions of a pin 44 which passes through an operating shaft 45. This operating shaft 45 passes through the opening 5 in which it is slidably and rotatably mounted and at its outer end has a head 46 formed with flat side faces from which lead sockets 47 which are provided for reception of a turning bar 48 by means of which the operating shaft is turned and rotary motion imparted to the drove shaft so that the threaded post or worm will be rotated and tilting movement imparted to the levers 22.

Figure 2:
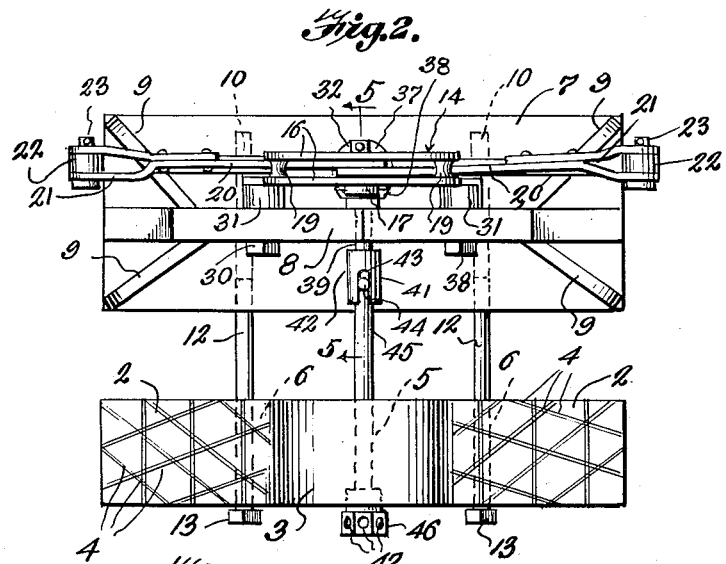
Fig. 2 is a top plan view thereof.
Figure 6:
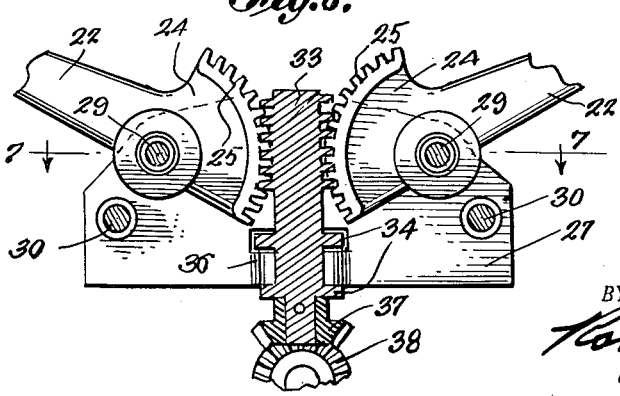
Fig. 6 is a vertical sectional view taken along the line 6—6 of Figure 3.

When this jack is in use it is set in place in front of a front wheel or a rear wheel of an automobile with the levers 22 in the fully lowered position shown in Figures 1 and 3. The car is then driven forwardly and as the elevating mechanism is in the lowered position the axle may move forwardly into position over the axle as the tire of the wheel rolls along the confronting ramp and into place upon the seat 3. If it is found that the saddle 14 is not disposed inwardly from the wheel the proper distance for it to engage the under surface of the axle when raised the base 7 is shifted away from the block 1 to an adjusted position such as shown in Figure 2.

The rods or pins 12 still hold the shaft 45 in alignment with the shaft 39, to prevent it from being bent and also allow it to turn freely in the opening 5, and the handle bar 48 is then fitted into one of the sockets 47 and turning movement imparted to the shaft. This is repeated by transferring the turning bar from one socket to another and, as the shaft 45 is turned the shaft 39 is turned with it, the worm or post 33 will be rotated and the levers 22 swung upwardly. The arms or links move with the levers and this causes the saddle to be raised until it engages under the axle and applies upward lifting force to raise the axle and support the wheel in an elevated position with the tire spaced upwardly from the block. The block is drawn outwardly away from the base 7 and the pins 12 and the operating shaft 46 are withdrawn with it. The block will thus be out of the way and a tire chain may be easily applied or removed or the wheel removed, if its tire is punctured, and a spare wheel and tire applied. After the chain or spare wheel has been applied it is merely necessary to apply the turning shaft to the drive shaft after setting the block in place under the wheel and the drive shaft can be turned in a direction to lower the elevating mechanism until the tire is at rest upon the block. The vehicle may then be driven forwardly or rearwardly and the wheel will roll off of the block and onto the ground. The jack can then be placed in the trunk of the car until again needed.

Having thus described the invention, what is claimed is:

1. A jack comprising a base, a riser projecting upwardly from said base, a bearing vertically disposed supported at one side of said riser, a post rotatably mounted vertically in said bearing and having a threaded portion, levers pivotally mounted at opposite sides of the bearing for vertical swinging movement and having arcuate heads at their lower ends formed with rack teeth meshing with threads of said post, links pivoted to said levers and projecting inwardly therefrom, a saddle to which inner ends of said links are pivotally connected, a gear carried by the lower end of said post, a drive shaft rotatably mounted through said riser, a gear carried by said drive shaft and meshing with the gear of said post, and a member for turning the operating shaft and thereby rotating said post and effecting swinging movement of the levers to shift the saddle to vertically adjusted positions.

2. A jack comprising a base, a bracket carried by said base and formed with a bearing disposed vertically, a worm screw rotatably mounted vertically in said bearing and projecting downwardly therefrom, levers having lower ends pivoted to said bracket and formed with arcuate racks meshing with opposite side portions of said worm screw, links pivoted to upper ends of said levers, a saddle, said links having inner ends intersecting and pivoted to said saddle midway the length thereof and tiltably mounting the saddle, and means for rotating said worm screw to tilt the levers vertically and vertically shift said saddle.

3. A jack comprising a base, a bracket carried by said base and consisting of inner and outer side plates having opposed portions midway the length of the bracket bowed outwardly and forming a vertically disposed bearing open at upper and lower ends, a worm screw disposed vertically in said bearing and having its lower portion provided with vertically spaced collars, said bearing having slots formed in its side walls and below the slots having portions pressed inwardly and fitting between said collars to rotatably support the worm screw in a bearing, a gear carried by the lower end of said worm screw, a toggle structure pivoted to said bracket between the inner and outer plates thereof and having arcuate racks meshing with opposite sides of the worm screw for vertical movement, a saddle at the upper end of said toggle structure, a drive shaft rotatably mounted transversely of said base in a horizontal position, and a gear carried by said drive shaft and meshing with the gear of said worm screw for rotating the worm screw when the drive shaft is turned.

WILLIAM J. PECK.

REFERENCES CITED

The following references are of record in the file of this patent:

UNITED STATES PATENTS

| Number | Name | Date |
| --- | --- | --- |
| 2,254,149 | Jensen | Aug. 26, 1941 |
| 2,502,924 | Care et al. | Apr. 4, 1950 |